Figure 1:
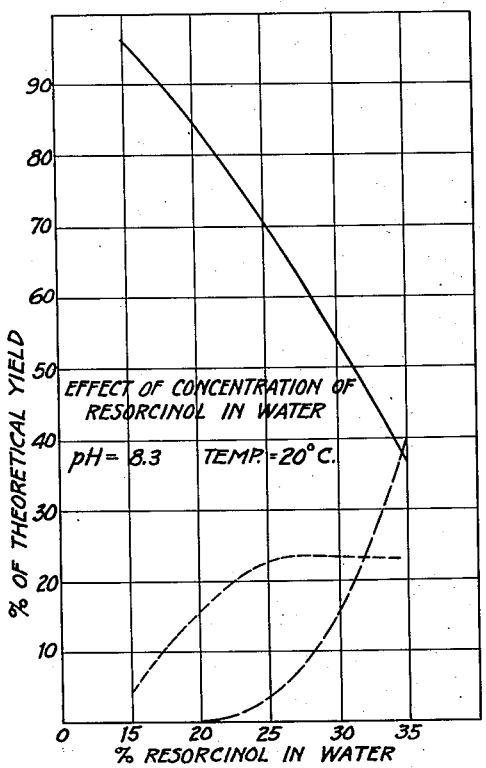
Figure 2:
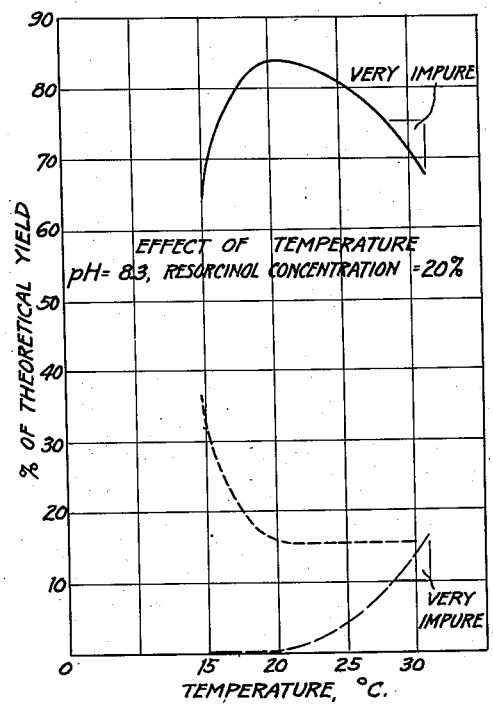
Figure 3:
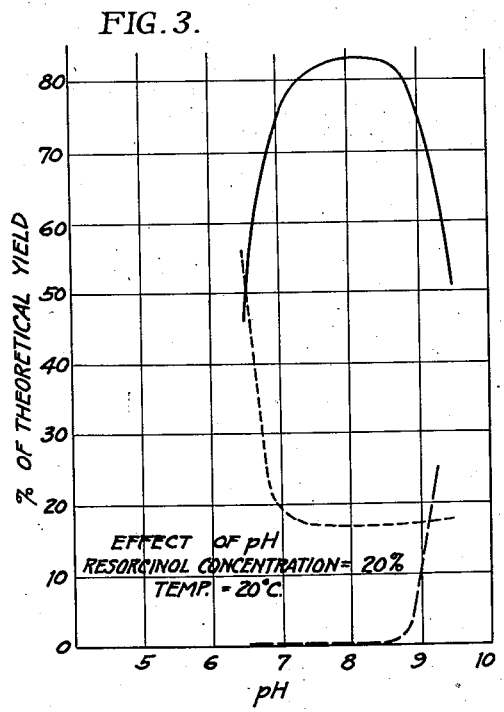

Oct. 16, 1951 W. M. GEARHART ET AL 2,571,703
PROCESS OF MANUFACTURING RESORCINOL MONOBENZOATE
Filed June 30, 1949

LEGEND
——— RESORCINOL MONOBENZOATE
——— RESORCINOL DIBENZOATE
——— BENZOIC ACID

WILLIAM M. GEARHART
ROY O. HILL, JR.
MARGARET H. BROYLES
INVENTORS

BY Daniel S. Mayne
Ruth E. Meiling
ATTORNEYS

UNITED STATES PATENT OFFICE 2,571,703

PROCESS OF MANUFACTURING RESORCINOL MONOBENZOATE

William M. Gearhart, Roy O. Hill, Jr., and Margaret H. Broyles, Kingsport, Tenn., assignors to Eastman Kodak Company, Rochester, N. Y., a corporation of New Jersey Application June 30, 1949, Serial No. 102,222

5 Claims. (Cl. 260—476)

This invention relates to a process of manufacturing resorcinol monobenzoate, and more particularly to a commercially feasible process of manufacturing resorcinol monobenzoate. As is set forth in U. S. Patent 2,436,116 of Meyer and Gearhart, resorcinol monobenzoate is an excellent agent for inhibiting deterioration of cellulose organic ester plastics by ultra-violet light.

It has been known to prepare monobenzoates of resorcinol and its isomers from the dihydric phenol and benzoyl chloride in the presence of an alkali. For example, Witt and Meyer, Ber. 26, 1076 (1893) showed the preparation of catechol monobenzoate by stirring an aqueous solution of catechol with the theoretical amount of benzoyl chloride and then allowing soda solution to flow in. Einhorn and Holandt, Ann. 301, 104 (1898) stated that resorcinol monobenzoate could be obtained by the method tested by Witt and Meyer with catechol. Witt and Johnson, Ber. 26, 1909 (1893) showed making hydroquinone monobenzoate in 60% yield by adding soda to an aqueous solution of hydroquinone, and allowing somewhat more than the calculated amount of benzoyl chloride to flow in, while agitating. Kehrmann, Sandoz and Monnier, Helv. Chim. Acta 4, 941-8 (1921) described the preparation of hydroquinone monobenzoate by dissolving hydroquinone in an aqueous solution of sodium bicarbonate and treating with benzoyl chloride, with agitation. One of us has repeated Kehrmann et al.'s work, but the highest yield he was able to obtain, even omitting their purification step, which he found unworkable, was 43.6% of theoretical.

We have discovered that by careful control of reaction conditions, some of which we have found to be critical, resorcinol monobenzoate can be manufactured on a commercial scale from resorcinol and benzoyl chloride, in the presence of sodium hydroxide, with yields of 80-90% or better. These conditions, and the process of manufacture, are set forth in detail below.

In the manufacture of resorcinol monobenzoate from resorcinol and benzoyl chloride in the presence of alkali, there are two major side reactions which tend to cut down the yield of resorcinol monobenzoate. One is the formation of resorcinol dibenzoate; the other is the formation of benzoic acid.

In the process of our invention, we start by making up an aqueous solution of resorcinol, of 15-20% concentration. The upper limit of 20% concentration is critical for high yields of resorcinol monobenzoate. This solution is brought to a temperature of 20° C., which is maintained throughout the reaction, with not more than 1° C. variation in either direction. We have found that this temperature is also critical for high yields.

We prefer to use a 33⅓% solution of sodium hydroxide, but this concentration is not critical. Lower concentrations of sodium hydroxide permit easier control of the pH, but greater volumes must be allowed for in the equipment used.

The equipment in which the reaction is carried out must be resistant to alkali. We prefer to use stainless steel of the 304 or 310 type (standard type numbers of the American Iron and Steel Institute). The sodium hydroxide solution is preferably introduced into the reaction vessel below the surface of the resorcinol solution in order to avoid direct reaction of the sodium hydroxide with the benzoyl chloride. The reaction vessel must be provided with an efficient agitator. The agitation, throughout the reaction, must be thorough, but unless the reaction mixture is blanketed with an inert gas, such as nitrogen, care must be taken that the agitation is not so violent as to cause splashing and unnecessary aeration of the resorcinol solution, such as by sucking air down a vortex to the agitator blades and distributing bubbles through the solution.

Sodium hydroxide solution is added to the solution until the pH rises to 7.5-8.5, preferably approximately 8.0-8.3. The pH must be checked continually throughout the reaction, either by withdrawing samples and testing them, or by a pH meter with electrodes dipping into the reaction mixture. When the pH of the solution has been brought to 7.5-8.5 by addition of sodium hydroxide, addition of benzoyl chloride on the surface of the liquid is begun, preferably at a rate which will give complete addition of the theoretical amount in about one hour. A slight excess of benzoyl chloride may be used. During the addition of the benzoyl chloride, the pH is kept at 7.5-8.5, preferably 8.0-8.3, by continued addition of sodium hydroxide. We have found that this range of 7.5-8.5 for the pH is critical for high yields of resorcinol monobenzoate. After all of the benzoyl chloride has been added, agitation and addition of sodium hydroxide are continued until the pH of the solution shows no further tendency to drop. This usually requires about one-half hour.

The slurry of resorcinol monobenzoate which results from the reaction is filtered, washed with hot water, and purified.

The critical nature of the concentration of resorcinol, temperature, and pH is illustrated by the accompanying drawings, which show the yields of resorcinol monobenzoate, resorcinol dibenzoate, and benzoic acid when each of the three factors is varied while the other two remain constant. In the drawings, the solid line represents the yield, in percent of theoretical, of resorcinol monobenzoate, and the long-dashed line the percent yield of resorcinol dibenzoate based on the theoretical if all of the benzoyl chloride had reacted to form dibenzoate. Resorcinol monobenzoate is soluble in methanol at room temperature, whereas resorcinol dibenzoate is not. The short-dashed line represents the per cent of benzoyl chloride unaccounted for. This can probably all be attributed to benzoic acid formation.

Figure I shows the effect of the initial concentration of the aqueous solution of resorcinol, with the pH at 8.3 and the temperature at 20° C. Concentrations of from 15% to 35% are included in the graphs. It will be noted that the yield of resorcinol monobenzoate falls sharply and almost uniformly from 15% concentration to 35% concentration. The yield of benzoic acid rises sharply from 15% to 25% concentration, where it levels off, while production of resorcinol dibenzoate begins at slightly above 20% concentration and rises sharply to 35% concentration. Thus, 20% concentration is the critical upper limit for high yields of resorcinol monobenzoate. The use of resorcinol solutions of less than 15% concentration is uneconomical, because of the large volume to be handled.

Figure II shows the effect of the reaction temperature, with the pH at 8.3 and the initial concentration of the resorcinol solution at 20%. It will be noted that at 20° C. the yield of resorcinol monobenzoate is at a rather sharp maximum, the yield of benzoic acid has just fallen practically to a minimum, and the formation of resorcinol dibenzoate is just about to begin, as the temperature is increased.

Figure III shows the effect of the pH value, with the initial resorcinol concentration at 20% and the temperature at 20° C. It will be seen that from pH 7.5 to pH 8.5 the yield of resorcinol monobenzoate is at or near a maximum, the yield of benzoic acid at a minimum, and no resorcinol dibenzoate is formed, production of the dibenzoate just beginning at 8.5 as the pH is increased.

Potassium hydroxide may be used in place of sodium hydroxide; it has about the same catalytic activity, but gives slightly more dibenzoate.

Slightly more than the theoretical amount of sodium hydroxide is required, to maintain the pH at 7.5–8.5 till the end of the reaction.

In general, the faster the reaction, and the less time the resorcinol is exposed to sodium hydroxide, the less the color developed in the reaction mixture and in the product. There is a limit, however, to the reaction speed of the benzoyl chloride. If the reaction speed is exceeded by the addition speed, the particles of precipitate coagulate and form large lumps on the agitator and the walls of the reaction vessel.

In place of running in the sodium hydroxide below the surface of the resorcinol solution and the benzoyl chloride on top, the sodium hydroxide may be run in on top and the benzoyl chloride below the surface, if precautions are taken to keep the mouth of the benzoyl chloride tube free from precipitate. This procedure has the advantage of limiting the vaporization of the benzoyl chloride, which is an extremely powerful lachrymator, especially in the presence of moisture. In any case, no fumes of benzoyl chloride should be allowed to escape.

The reaction vessel must be provided with cooling means, such as a water jacket or a brine coil.

The starting materials which we have used are not absolutely pure. The benzoyl chloride is believed by its manufacturer to be better than 99% pure, the impurities being mostly benzoic acid and traces of benzotrichloride. The presence of a small amount of either or both would aid in accounting for the small amount of sodium hydroxide which is usually required above theoretical.

The resorcinol which we prefer to use is technical grade and contains 1% of phenol plus colored impurities. In identical runs with technical grade and C. P. resorcinol, the yields were 99% and 85% respectively.

The sodium hydroxide which we prefer to use is reagent grade, assayed at 97.0% NaOH. The quality of the sodium hydroxide should not be critical, but it should not have a high carbonate content, or a loss in yield may result.

In using a pH meter whose electrodes are immersed in the reaction mixture, too rapid addition of benzoyl chloride may cause the meter needle to oscillate. This condition may be remedied by rinsing the electrodes with acetone and then with distilled water, and slowing down the addition of the benzoyl chloride. The glass electrode of the pH meter should be one on which sodium ions have little effect, such as a No. 1190 glass electrode manufactured by Beckman Instruments, National Technical Laboratories, South Pasadena 13, California, in order to avoid the calculations otherwise required for correction of the readings.

By way of a more detailed illustration of the method of carrying out our process, we give the following example.

1140 lbs. of water is weighed into a 3½' x 4' stainless steel tank provided with an agitator and a brine coil. The agitator is started, and allowed to continue running throughout the reaction. 200 lbs. of resorcinol is added, and stirred until dissolved. A 33⅓% solution of sodium hydroxide is made up and charged into the vessel from which it will be added to the reaction mixture. Benzoyl chloride is charged into another addition vessel. Sodium hydroxide solution is then added to the resorcinol solution until the pH reaches a value of 8.0, and this pH is maintained within 0.1 during the reaction, by addition of sodium hydroxide as necessary. The temperature of the reaction mixture is brought to 20° C., and is kept at 19–21° C. throughout the reaction. 268 lbs. of benzoyl chloride is added over a period of one hour, or longer if necessary. If the particles of resorcinol monobenzoate formed early in the reaction begin to lump together and stick to the sides of the reaction vessel, the addition of benzoyl chloride is discontinued until white, hard particles are re-formed, and then is resumed at a slower rate. The same remedy is applied if the temperature goes too high. If the temperature drops too low, it may be raised by temporarily increasing the rate of addition of benzoyl chloride, but this procedure should not be attempted below 17–18° C., since the reaction rate drops very fast as the temperature falls toward 15° C., and the addition of extra benzoyl chloride will result in lumping up of the product as described above, and loss of yield.

After all the benzoyl chloride has been added, stirring is continued for 30 minutes, the temperature being still maintained at 20° C. and the pH at 8.0. Some additional sodium hydroxide is required during this time.

The product is then filtered on a suction filter, and washed with hot water, the temperature of the water being 80–90° C. The product may be purified as follows.

Two batches of the crude resorcinol monobenzoate prepared as just described are charged into the stainless steel tank used for the reaction. 450 lbs. of acetone is added, and the mixture is heated, with stirring, to 50° C. Stirring is continued until solution is complete. As much warm water, at 50° C., is added to the tank as it will hold. The solution is allowed to cool to 30° C., and is then cooled by means of the brine coil over a period of about 4 hours to 5° C., or as close to that temperature as possible. The product is then filtered and washed with cold water, sucked as dry as possible on a suction filter, and dried in a tray drier.

What we claim as our invention and desire to be secured by Letters Patent of the United States is:

1. A process of manufacturing resorcinol monobenzoate in yields of at least 80%, which comprises treating an aqueous solution of resorcinol, of 15–20% concentration, with an aqueous solution of sodium hydroxide until the solution has a pH of 7.5–8.5, bringing the temperature of the solution to 19–21° C., adding benzoyl chloride gradually to the solution, maintaining the pH of the reaction mixture at 7.5–8.5 throughout the reaction by continued addition of sodium hydroxide solution, and maintaining the temperature of the reaction mixture at 19–21° C. throughout the reaction.

2. A process of manufacturing resorcinol monobenzoate in yields of at least 80%, which comprises treating an aqueous solution of resorcinol, of 15–20% concentration, with an aqueous solution of sodium hydroxide until the solution has a pH of 8.0–8.3, bringing the temperature of the solution to 19–21° C., adding benzoyl chloride gradually to the solution, maintaining the pH of the reaction mixture at 8.0–8.3 throughout the reaction by continued addition of sodium hydroxide solution, and maintaining the temperature of the reaction mixture at 19–21° C. throughout the reaction.

3. A process of manufacturing resorcinol monobenzoate in yields of at least 80%, which comprises treating an aqueous solution of resorcinol, of 15–20% concentration, with an aqueous solution of sodium hydroxide of approximately 33⅓% concentration until the solution has a pH of 7.5–8.5, bringing the temperature of the solution to 19–21° C., adding benzoyl chloride gradually to the solution, maintaining the pH of the reaction mixture at 7.5–8.5 throughout the reaction by continued addition of the sodium hydroxide solution, and maintaining the temperature of the reaction mixture at 19–21° C. throughout the reaction.

4. A process of manufacturing resorcinol monobenzoate in yields of at least 80%, which comprises treating an aqueous solution of resorcinol, of 15–20% concentration, with an aqueous solution of sodium hydroxide until the solution has a pH of 7.5–8.5, bringing the temperature of the solution to 19–21° C., adding benzoyl chloride gradually to the solution, maintaining the pH of the reaction mixture at 7.5–8.5 throughout the reaction by continued addition of sodium hydroxide solution during and after the addition of the benzoyl chloride, and maintaining the temperature of the reaction mixture at 19–21° C. throughout the reaction.

5. A process of manufacturing resorcinol monobenzoate in yields of at least 80%, which comprises treating an aqueous solution of resorcinol, of 15–20% concentration, with an aqueous solution of sodium hydroxide until the solution has a pH of 7.5–8.5, bringing the temperature of the solution to 19–21° C., adding approximately the theoretical amount of benzoyl chloride gradually to the solution, maintaining the pH of the reaction mixture at 7.5–8.5 throughout the reaction by continued addition of sodium hydroxide solution, and maintaining the temperature of the reaction mixture at 19–21° C. throughout the reaction.

WILLIAM M. GEARHART.
ROY O. HILL, Jr.
MARGARET H. BROYLES.

REFERENCES CITED

The following references are of record in the file of this patent:

UNITED STATES PATENTS

| Number | Name | Date |
| --- | --- | --- |
| 2,245,721 | Ross | June 17, 1941 |

OTHER REFERENCES

Johnson: Berichte, vol. 26, p. 1909 (1893).
Eindom: Annalen der Chemie, vol. 301, p. 104 (1898).
Kaufmann: Berichte, vol. 44 (1) p. 754 (1911).
Klhrmann: Helv. Chem. Acta, vol. 4, pp. 941–948 (1921).